United States Patent
Hoogenboom et al.

(10) Patent No.: US 6,874,025 B2
(45) Date of Patent: Mar. 29, 2005

(54) SYSTEM AND METHOD OF APPLICATION INPUT VALIDATION

(75) Inventors: Peter J. Hoogenboom, Salt Lake City, UT (US); Richard G. Ireland, Park City, UT (US); Douglas P. Bogia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 811 days.

(21) Appl. No.: 09/746,932

(22) Filed: Dec. 22, 2000

(65) Prior Publication Data

US 2002/0083171 A1 Jun. 27, 2002

(51) Int. Cl.[7] ........................................... G06F 15/173
(52) U.S. Cl. ................................... 709/225; 709/203
(58) Field of Search ................................. 709/225, 229; 710/36; 711/111–114, 150; 340/825

(56) References Cited

U.S. PATENT DOCUMENTS

| | | | | |
|---|---|---|---|---|
| 5,287,403 A | * | 2/1994 | Atkins et al. | 379/144.04 |
| 5,572,640 A | * | 11/1996 | Schettler | 345/440 |
| 5,907,680 A | * | 5/1999 | Nielsen | 709/228 |
| 5,930,258 A | * | 7/1999 | Dato Solis et al. | 370/401 |
| 5,964,891 A | * | 10/1999 | Caswell et al. | 714/31 |
| 6,041,324 A | * | 3/2000 | Earl et al. | 707/9 |
| 6,247,171 B1 | * | 6/2001 | Yellin et al. | 717/126 |
| 6,304,905 B1 | * | 10/2001 | Clark | 709/224 |
| 6,393,468 B1 | * | 5/2002 | McGee | 709/218 |
| 6,507,857 B1 | * | 1/2003 | Yalcinalp | 715/513 |
| 6,519,228 B1 | * | 2/2003 | Creamer et al. | 379/15.01 |
| 6,615,258 B1 | * | 9/2003 | Barry et al. | 709/223 |
| 6,629,098 B2 | * | 9/2003 | Mc George, Jr. | 707/6 |
| 2002/0007409 A1 | * | 1/2002 | Rode | 709/227 |
| 2002/0065689 A1 | * | 5/2002 | Bingham et al. | 705/5 |
| 2002/0069365 A1 | * | 6/2002 | Howard et al. | 713/201 |
| 2002/0082857 A1 | * | 6/2002 | Skordin et al. | 705/1 |
| 2002/0163535 A1 | * | 11/2002 | Mitchell et al. | 345/744 |
| 2003/0046361 A1 | * | 3/2003 | Kirsch et al. | 709/217 |

OTHER PUBLICATIONS

Merlin, "Specification and Validation Protocol", IEEE Transactions on communication, vol. COM–27, No. 11, Nov. 1979, pp. 1671–1680.*

Heidemann, et al, "Modeling the Performance of HTTP Over Several Transport Protocols", IEEE/ACM Transactions on Networking, vol.5, No. 5, Oct. 1997, p. 616–630.*

Feigin et al, "Hardware–fitted Modeling and Simulation of VoIP over a Wireless LAN", IEEE, 2000, p. 1431–1438.*

Drummond et al, "Intelligent Browsing for Multimedia Applications", IEEE, 1996, p. 386–389.*

Devanbu et al, "Research directions for automated software verification Using trusted hardware", IEEE, 1997, pp. 274–279.*

Zafiropulo, "Protocol Validation by Duologue–Matrix Analysis", IEEE, 1978, pp. 1187–1194.*

Hailpern, "Modular Verification of Computer communication Protocols", IEEE, 1993, pp. 56–68.*

* cited by examiner

*Primary Examiner*—Bunjob Jaroenchonwanit
(74) *Attorney, Agent, or Firm*—Steven D. Yates (57) ABSTRACT

A system and method of validating user inputs to a server based application are disclosed. A network server receives inputs to an application process from external processes at a plurality of communication interfaces. A validation engine determines validation criteria for inputs to the application process received at any one of the communication interfaces.

34 Claims, 9 Drawing Sheets

SYSTEM AND METHOD OF APPLICATION INPUT VALIDATION

BACKGROUND

1. Field

The subject matter of this disclosure relates to data networks. In particular, this disclosure relates to systems and methods of receiving inputs to an application process through a communication network.

2. Information

Services are typically provided over the Internet at a server platform by receiving inputs for server based applications from client processes. For the inputs to be valid, the inputs typically must conform to constraints. For example, an application receiving text based inputs typically require that the inputs conform to a particular alphanumeric format. This is particularly common in applications which receive inputs from a network browser through a hypertext transfer protocol (HTTP) server.

An HTTP server typically transmits hypertext markup language (HTML) pages to a network browser hosted on a client device for receiving inputs to a server application. The HTML pages may provide an entry form which is generated on a graphical user interface (GUI) of the client device for prompting a user to provide textual inputs to be transmitted back to the HTTP server. Upon receipt of the inputs, the HTTP server may execute logic to determine whether the received inputs are valid. The HTTP server may provide validated inputs to the server application and respond to invalid inputs by transmitting an error message back to the network browser.

Repeated transmission of invalid inputs to the HTTP server and corresponding error messages back to the network browser is a time consuming activity which uses communication resources. To reduce the need to transmit data between the HTTP server and the network browser in the process of providing valid inputs to the server application, the HTML page transmitted to the network browser may include an encoded script to validate the inputs at the network browser prior to sending any inputs to the HTTP server. This ensures that only valid inputs are received at the HTTP server.

A server application may be adapted to receive user inputs from external processes through other communication interfaces in addition to an HTTP server. Like inputs provided through the HTTP server, the inputs provided through the other communication interfaces are typically validated before being provided to the application. Accordingly, there is a need for a system and method of validating inputs to the server application according to consistent validation criteria regardless of the method of providing the inputs to the server application.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

An "application process" as referred to herein relates to one or more processes for providing a result or initiating action in response to inputs. For example, an application process may provide a service to an end user such as, for example, a communication service, commercial transaction, games, spreadsheet, word processing or database retrieval. However, embodiments of the present invention are not limited in this respect and an application process may be directed to providing other results or services.

In some embodiments, an application process may respond to input data to provide the result. For example, an application may receive inputs specifying a commercial transaction to be initiated by the application process. "Validation criteria" as referred to herein relates to criteria to be applied in determining whether inputs to an application process are acceptable by the application process to provide a result or initiate an action. However, embodiments of the present invention are not limited in this respect. A "validation engine" as referred to herein refers to a process for providing or applying validation criteria for inputs to an application.

A "client process" as referred to herein relates to processes for receiving user inputs to be forwarded to an application process. Such a client process may be adapted to forward the user inputs according to a communication protocol. However, embodiments of the present invention are not limited in this respect. A "client device" as referred to herein relates to a device for hosting a client process such as, for example, a personal computer system, mobile telephone, personal digital assistant. However, these are merely examples and embodiments of the invention are not limited in this respect.

A "communication interface" as referred to herein relates to a process for receiving inputs to an application process from a source and forwarding the inputs to the application process. A communication interface may receive the inputs from the source according to a communication protocol. In an example embodiment, a plurality of communication interfaces may be adapted to receive inputs to an application process from a plurality of sources. However, embodiments of the present invention are not limited in this respect.

A "server" as referred to herein relates to one or more processes for communicating with a client process according to a communication protocol. Such a server may be adapted to receive inputs to an application process from the client process. However, embodiments of the present invention are not limited in this respect.

Embodiments of the present invention relate to a system and method of validating inputs to an application process received at any one of a plurality of communication interfaces. A validation engine determines validation criteria for inputs to the application process received at any one of the communication interfaces. One of the communication interfaces may be a communication server (e.g., a hypertext transfer protocol (HTTP) server, see, e.g., Internet Official Protocol Standards RFC 2616, June 1999) adapted to receive inputs to the application process from a client process (e.g., a network browser) hosted on a client device. In response to a query from the communication server, the validation engine provides validation data representative of the validation criteria to the communication server. The communication server may then transmit an encoded script to the client process for executing a validation procedure at the client device.

Figure 1:
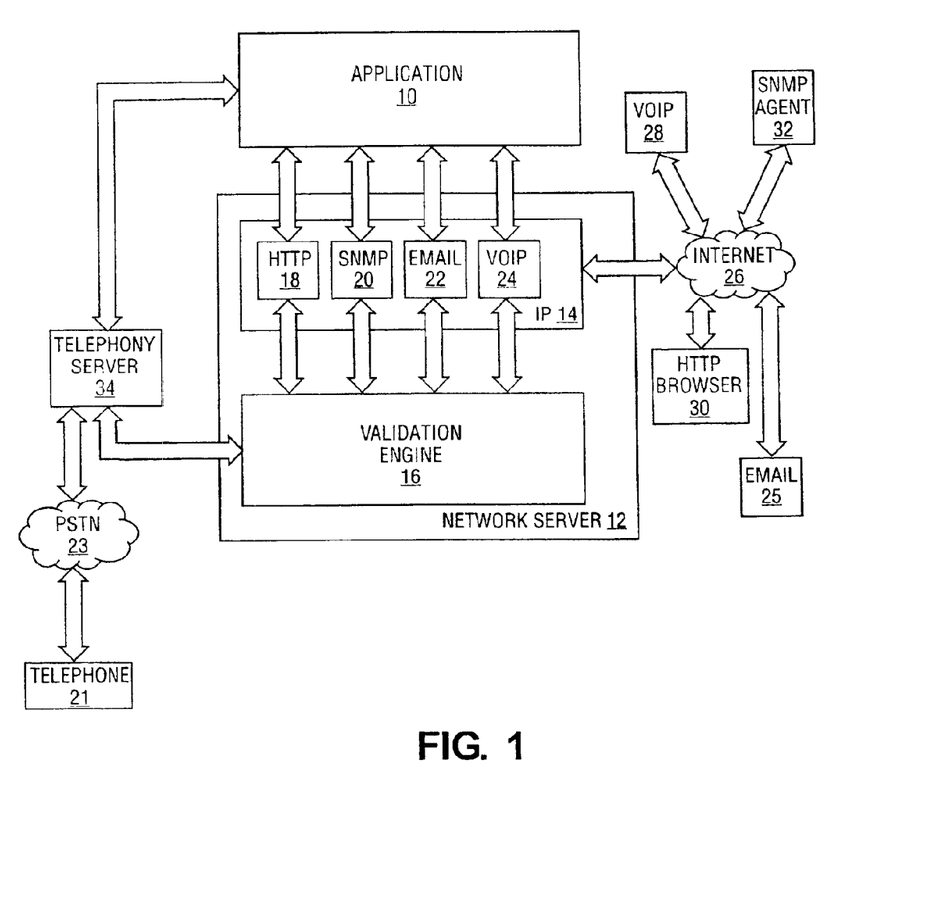
FIG. 1 shows a topology of a communication system for transmitting user inputs to an application process according to an embodiment of the present invention.

FIG. 1 shows the topology of a data communication system for providing inputs to an application process 10 according to an embodiment. A network server 12 comprises an Internet Protocol (IP) server 14 and a validation engine 16. However, this is merely a sample embodiment of a network server and does not limit embodiments of the invention. The IP server 14 may be coupled to one or more external processes hosted on external platforms such an HTTP browser 30, a Simple Network Management Protocol (SNMP) agent 32 (see, e.g., Internet Official Protocol Standards RFC 1157, May 1990) or voice-over Internet protocol (VoIP) process 28 (see, e.g., International Telecommunications Union Recommendation H.323) through a data communication network such as the Internet 26. However, these are just example external processes which may be coupled to the IP server 14 and does not limit embodiments of the present invention. It should be understood that the IP server 14 may be coupled to the external processes through any one of several public and private data communication networks capable of transmitting data according to an Internet protocol or other suitable communication protocols. The IP server 14 may coupled to the Internet 26 through an Internet gateway including a firewall. Again, this is merely an example of how the IP server 14 may be coupled to external processes and does not limit embodiments of the present invention.

The IP server 14 may provide a plurality of communication interfaces for receiving inputs to the application process 10 from the external processes. These communication interfaces may comprise an HTTP server 18, an SNMP manager 20, an electronic mail process 22 (see, e.g., Simple Mail Transfer Protocol, Internet Official Protocol Standards, RFC 821) and a VoIP process 24. However, embodiments of the present invention are not limited in this respect and the IP server 14 may comprise other communication interfaces.

In addition to IP based communication interfaces, a telephony server 34 coupled to a public switched telephone network (PSTN) 23 may provide a communication interface for receiving inputs to the application process 10 from an external telephony device 21. The telephony server 34 may include one or more telephone modems coupled to the PSTN 23 through telephone lines and sufficient CPU and memory resources to host a telephony applications programming interface (TAPI). Call handling routines hosted on the telephony server 34 may process calls received to provide inputs to the application process 10 via a network interface. Such call handling routines may include a procedure to validate inputs to the application process 10. However, this is merely a sample embodiment of the telephony server 34 and does not limited embodiments of the present invention.

The application process 10 may be any one of several processes for responding to external inputs such as, for example, an electronic commerce application which receives inputs as orders for goods or services from the external processes. However, this is merely an example of application process and other application processes may be used. The application process 10 may be hosted on a processing platform as part of an enterprise resource planning (ERP) system. However, embodiments of the present invention are not limited in this respect.

The validation engine 16 determines validation criteria for the inputs to the application process 10 from all communication interfaces. The validation criteria determined at the validation engine 16 is used to execute procedures at either the external processes or the communication interfaces to validate inputs to the application process 10. A single validation engine 16 enables modification to the input validation criteria without modification to the communication interfaces. Also, consistent validation criteria may be applied to inputs of the application process 10 regardless of whether a validation process occurs at an external processes or at a communication interface (for providing the inputs to the application 10).

FIG. 1 shows that the validation engine 16 and IP server 14 reside on the same network server 12. It should be understood, however, that the IP server 14 and the validation engine 16 may be hosted on the same or different hardware platforms and that embodiments of the present invention are not limited in this respect. FIG. 1 also shows that the application process 10 is distinct from the validation engine 16. In other embodiments, the validation engine 16 may be integrated as part of the application process 10 to interact with the communication interfaces as inputs are received at the communication interfaces. However, these are merely examples of how an application process and validation engine may be configured and embodiments of the present invention are not limited in this respect. In another alternative embodiment, the validation engine 16 may be hosted on a hardware platform which is distinct from hardware platforms hosting either the IP server 14 or the application process 10. In this embodiment, a processor platform for hosting the validation engine platform may have a standard hardware interface with the IP server 14 and the telephony server 34 for validating inputs to the application process 10. However, these are merely examples of how a validation engine and IP server may be integrated and embodiments of the present invention are not limited in this respect.

Figure 2:
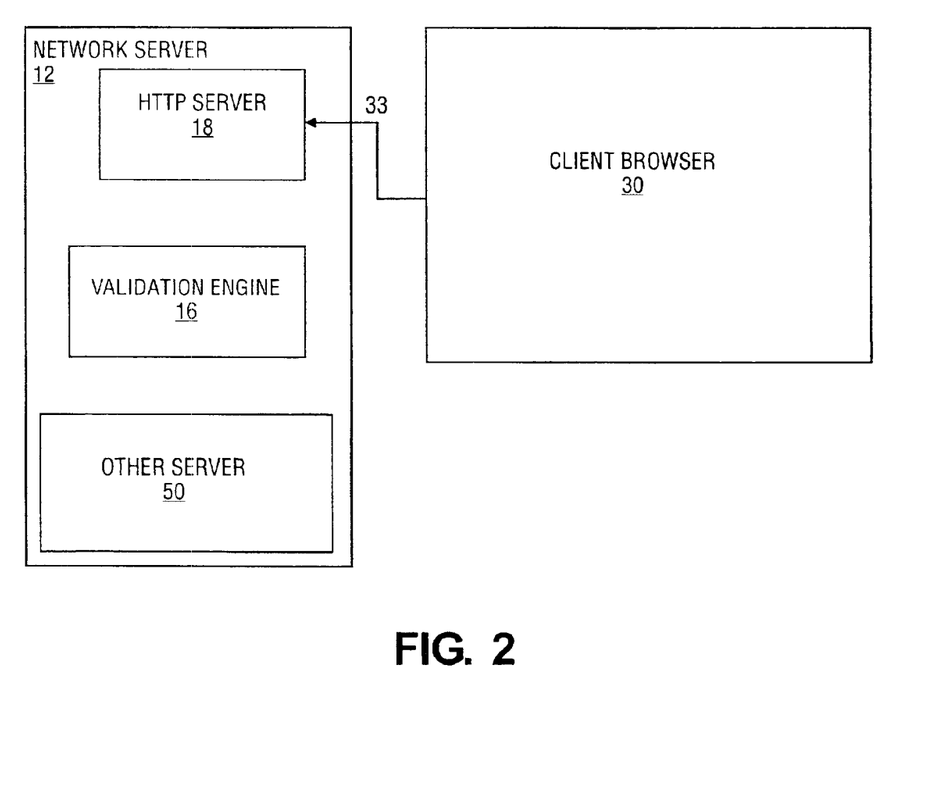
FIGS. 2 through 7 illustrate a process of validating inputs to the application process of FIG. 1 at a network browser hosted on an external client platform.
Figure 3:
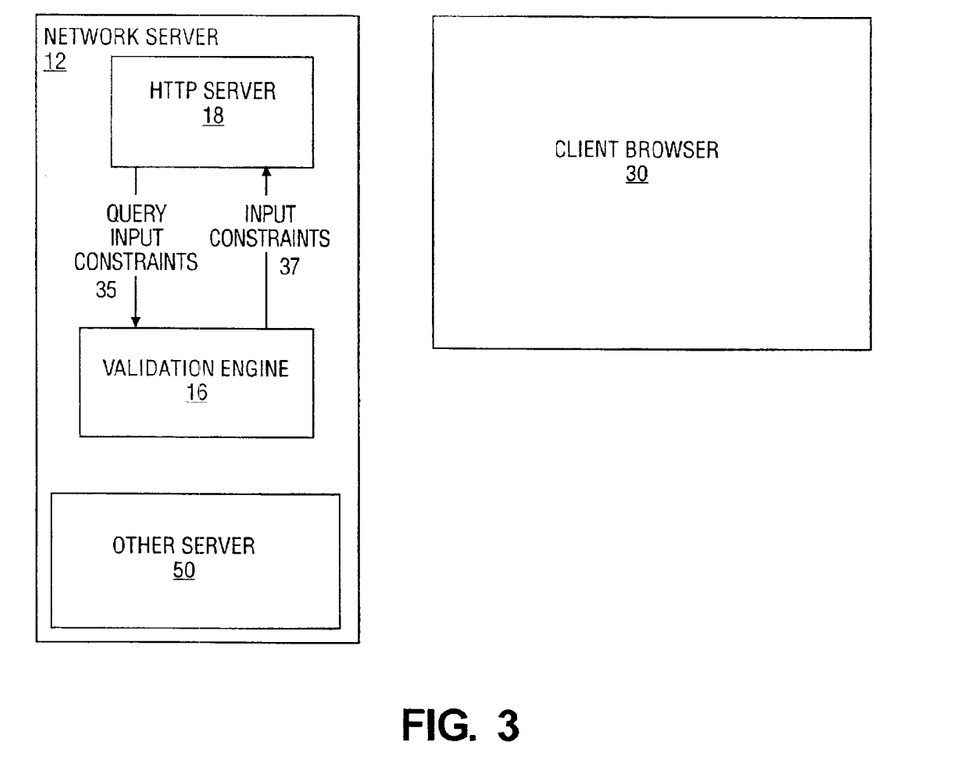

FIGS. 2 through 7 illustrate a process executed at an external device (e.g., client platform hosting the HTTP browser 30) for validating inputs to the application process 10. FIG. 2 illustrates that the HTTP browser 30 transmits a request 33 to the HTTP server 18 to provide inputs to the application process 10 (FIG. 1). In response to the request 33, the HTTP server 18 may transmit a query 35 to the validation engine for validation criteria as illustrated in FIG. 3. The validation criteria may include, for example, constraints on inputs which may be provided to the application process 10. In response to the query 35, the validation engine 16 provides validation criteria 37 to the HTTP server 18. It should be understood that a client platform hosting the HTTP browser 30 is merely an example of an external process which provides inputs to an application process and that embodiments of the present invention are not limited in this respect.

The validation engine 16 may determine the validation criteria 37 dynamically based upon aspects of the application process 10 and events detected at the validation server. For example, the validation criteria 37 may define input constraints for data types, completeness, date and time or other format related requirements. However, these are merely examples of validation criteria and embodiments of the present invention are not limited in these respects.

Figure 4:
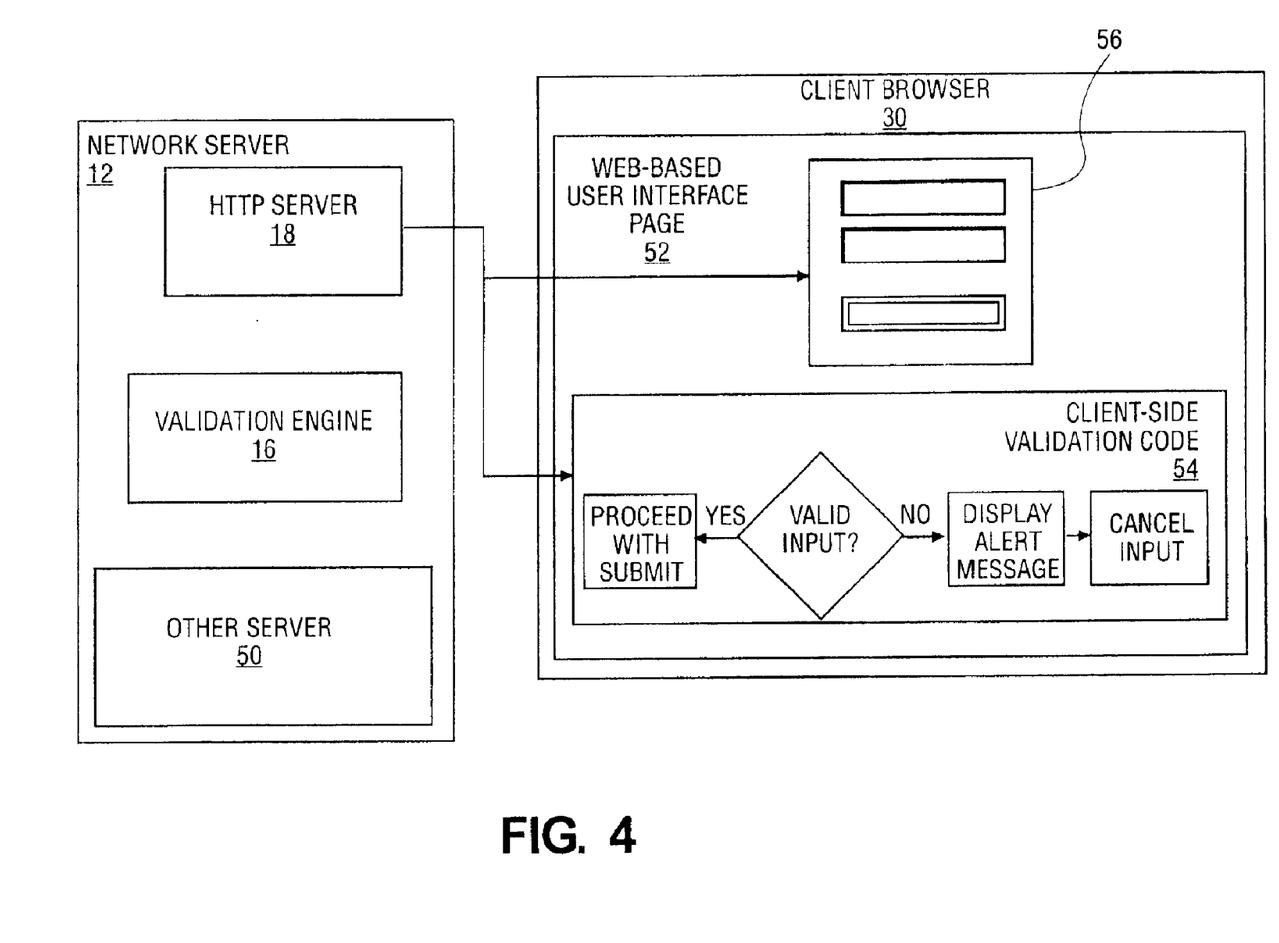

Based upon the received validation criteria 37, the HTTP server 18 generates and transmits a hypertext markup language (HTML) page 52 to the client browser 30 to receive user inputs as illustrated in FIG. 4. The HTML page 52 includes a graphical portion 56 and one or more executable scripts 54. The graphical portion 56 may appear as part of a user's graphical user interface (GUI) at the client platform. A script 54 may comprise an encoded procedure for validating user inputs provided at the graphical portion 56. The HTTP server 18 may generate the HTML page 52 script using a server-side scripting language such as Persona HomePage™, server-side JavaScript™ or Active Server Pages (ASP). The HTTP server 18 may dynamically generate the HTML page 52 in JavaScript™ and HTML based upon the validation criteria 37 to enforce validation rules for the inputs received at the graphical portion 56. However, these are merely examples of techniques for implementing server-side scripting and embodiments of the present invention are not limited in this respect.

Figure 5:
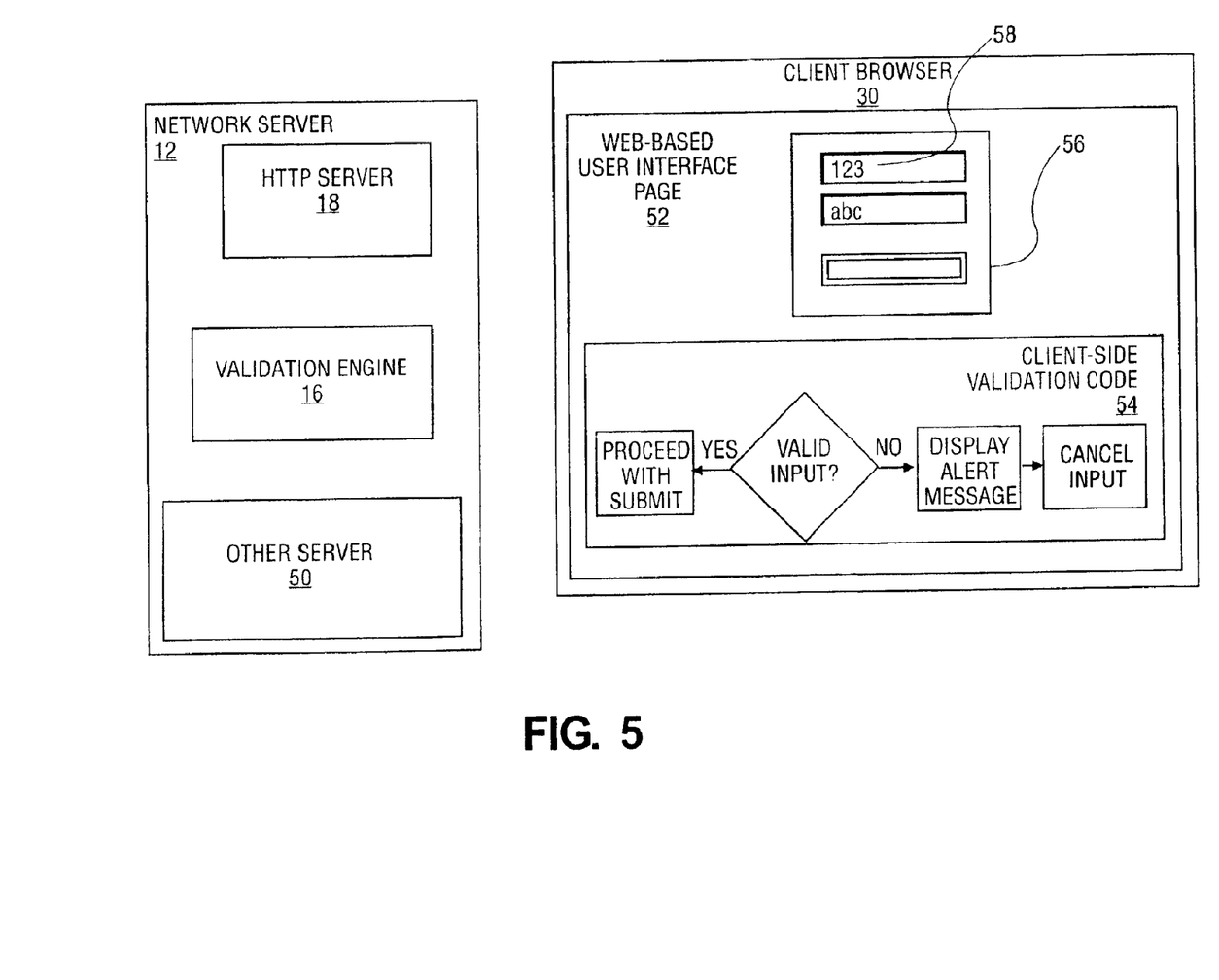
Figure 6:
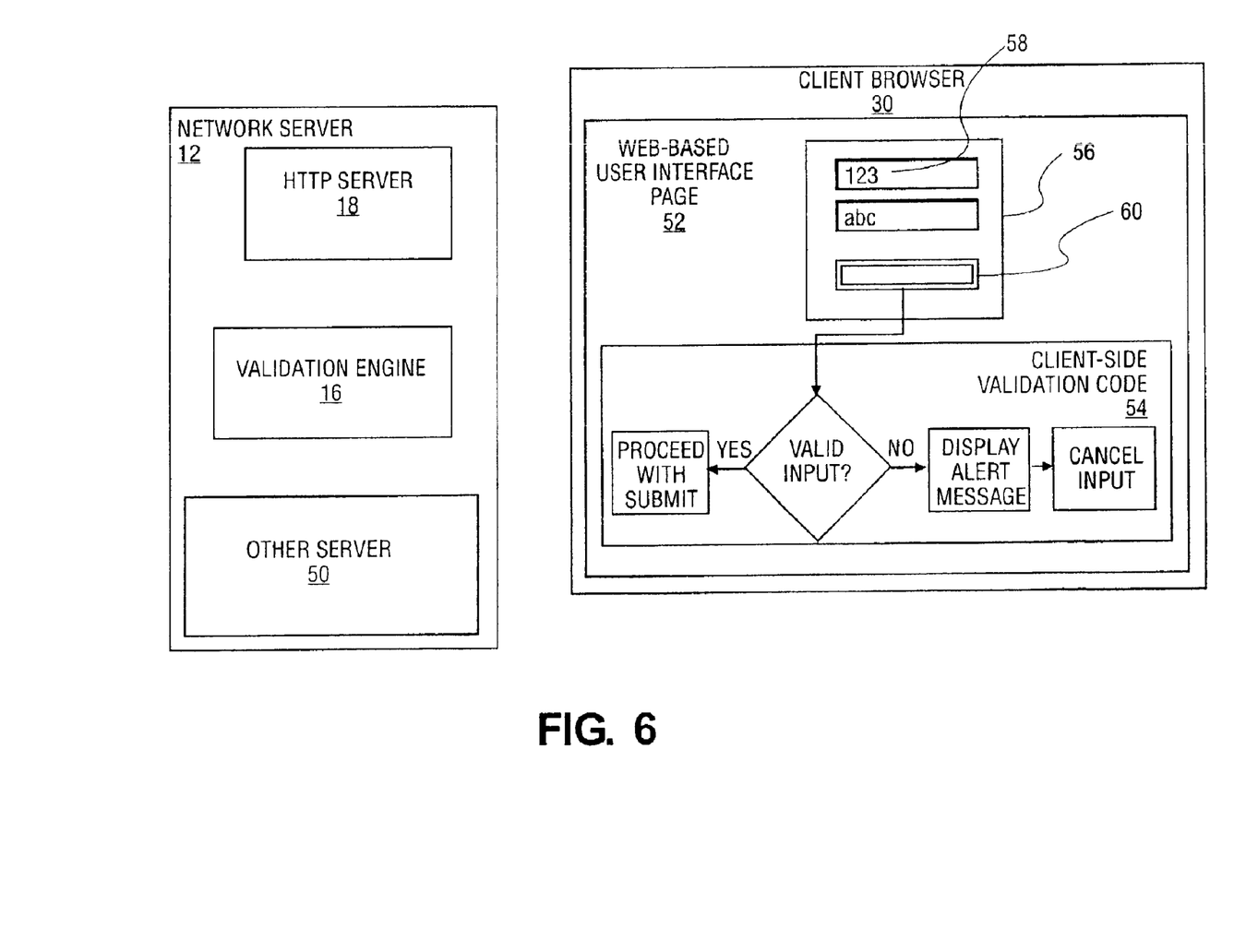
Figure 7:
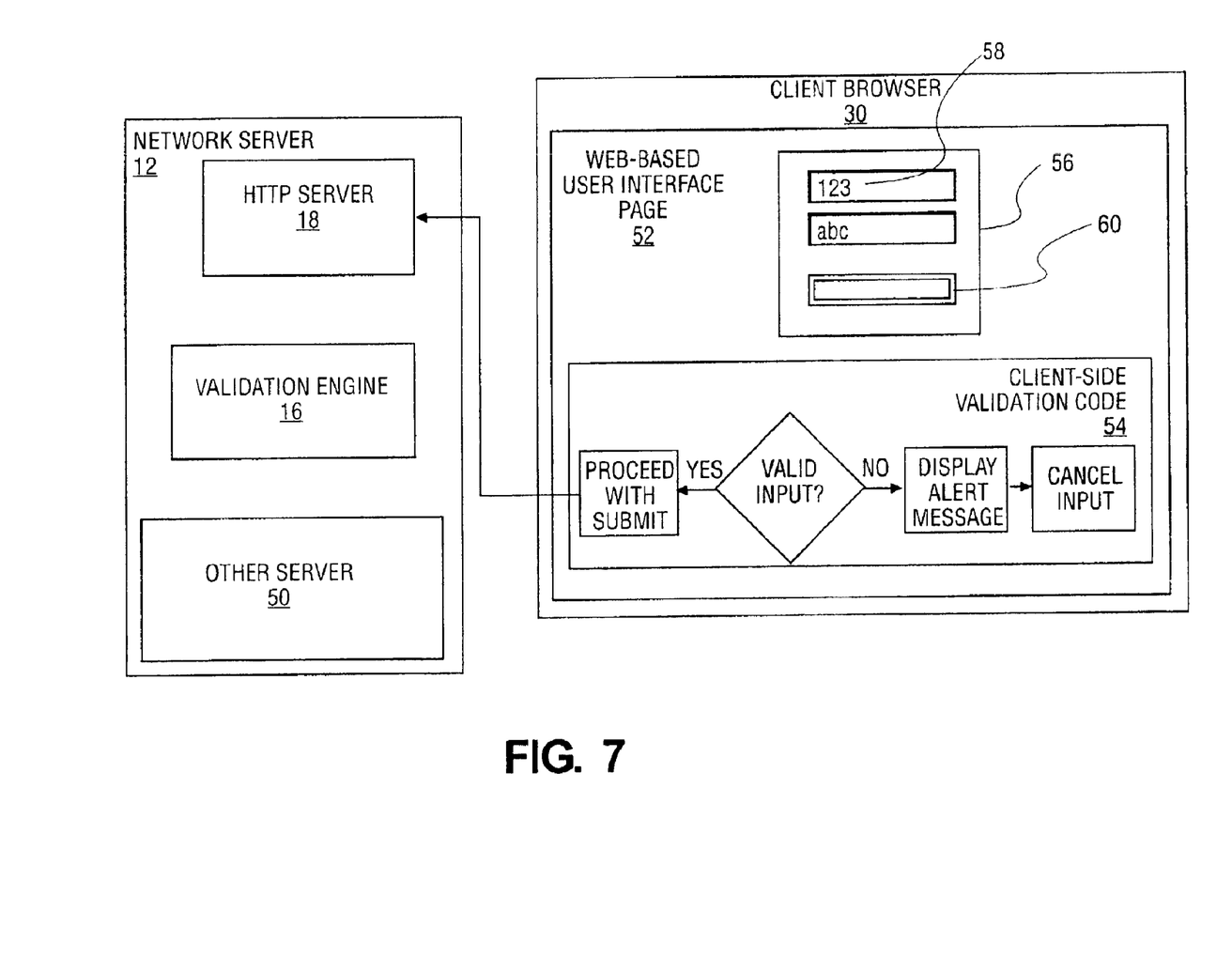

FIG. 5 shows user inputs 58 provided to the graphical portion 56. FIG. 6 illustrates the initiation of the execution of the script 54 upon selection of button 60 on the graphical portion 56. If the user inputs 58 meet the validation criteria, the script 54 transmits the validated inputs to the HTTP server 18 to be provided as inputs to the application process 10 (FIG. 1). If the script 54 determines that the user inputs 58 are not valid, the script 54 may suspend transmission of the user inputs 58 and generate a message on the GUI indicating that all or a part of the user inputs 58 are invalid. Additionally, the message may suggest corrective action such as, for example, providing instructions to the use to supply valid inputs. Alternatively, the script 54 may modify the user inputs 58 such that they meet the validation criteria and transmit the modified inputs to the HTTP server 18 without any further interaction with the user at the GUI. However, these are merely examples of corrective action and embodiments of the present invention are not limited in this respect.

Figure 8:
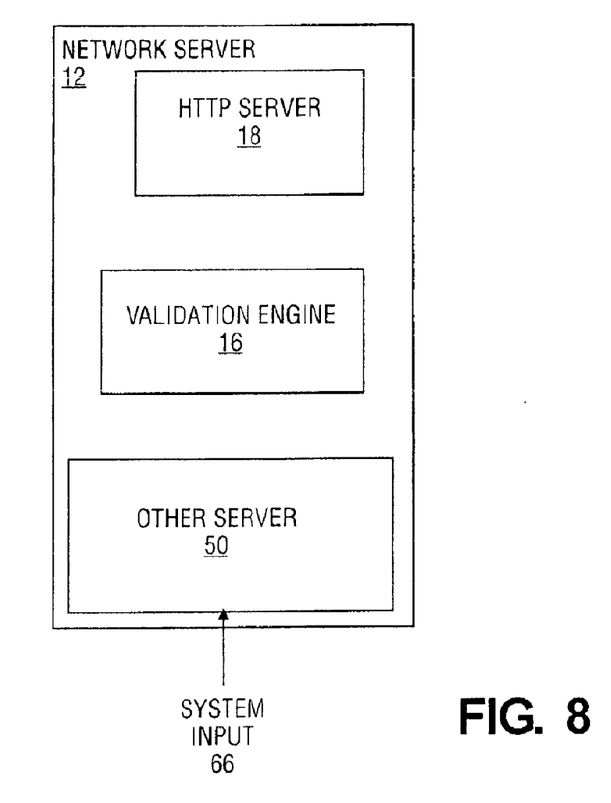
FIGS. 8 and 9 illustrate a process of validating inputs to the application process of FIG. 1 at a communication interface.
Figure 9:
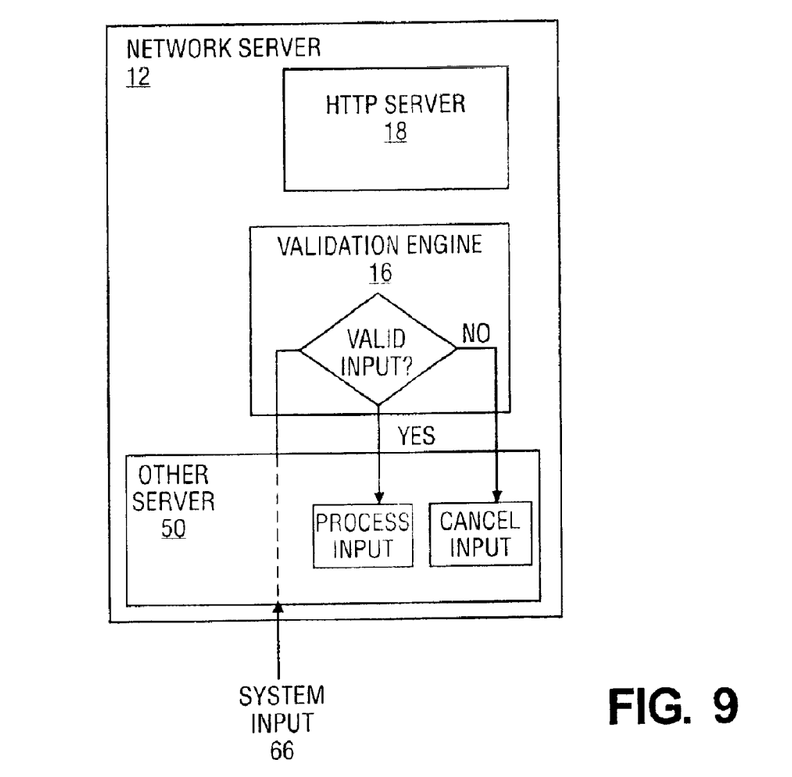

FIGS. 2 through 7 illustrate an example of a process in which user inputs to the application process 10 may be validated at the client platform. Upon receipt of the inputs at the communication interface (e.g., the HTTP server 18), the communication interface may provide the received inputs to the application process 10 without any further validation procedure. FIGS. 8 and 9 illustrate a process of validating user inputs (to the application process 10) after being received at a communication interface. A server 50 may comprise a communication interface to receive inputs which are to be validated at the communication interface in conjunction with the validation engine 16.

The server 50 may comprise any of the communication interfaces other than the HTTP server 18 such as the SNMP manager 20, electronic mail process 22 or VoIP process 24 on the IP server 14, or the telephony server 34. However, the server 50 may comprise other communication interfaces and embodiments of the present invention are not limited in this respect. The telephony server 34 and the VoIP process 24 may receive inputs to the application process 10 in the form of dual tone multi-frequency (DTMF) tones or voice data provided by the user at the telephony device 21. However, the telephony server 34 may receive inputs according to a different format and embodiments of the present invention are limited in this respect. The SNMP manager 20 may receive inputs to the application process 10 in the form of an SNMP message (e.g., an SNMP response to a GET or SET command) from the SNMP agent 32. The electronic mail process 22 may receive inputs to the application process 10 in the form of data provided in specific fields of an electronic mail message. However, the electronic mail process 22 may receive inputs according to a different format and embodiments of the present invention are not limited in this respect.

FIG. 8 shows that the server 50 is receiving a system input 66 from an external process. The server 50 then passes the system input 66 to the validation engine 16 for application of the validation criteria at the validation engine 16, and awaits a response indicating whether the system input 66 meets the validation criteria. If the validation engine 16 determines that the system input 66 is valid, the server 50 may then pass the system input 66 to the application process 10.

If the validation engine 16 determines that the system input 66 does not meet the validation criteria, the server 50 may modify the system input 66 to conform with the validation criteria (and may re-submit the modified system input 66 to the validation engine 16 for validation) before forwarding the system input 66 to the application process 10. Alternatively, the server 50 may transmit a message to the external process indicating that the input is invalid and may be resubmitted. For example, if the server 50 is the telephony server 34 or the VoIP process 24, the server 50 may transmit a prerecorded voice message back to the caller/user indicating that the received inputs are invalid. If the server 50 is the electronic mail process 22, the server 50 can transmit an electronic mail message to an address associated with the external process providing the system input 66. However, this merely illustrates examples of a validation engine and embodiments of the present invention are not limited in this respect.

In alternative embodiments, the validation engine 16 may communicate directly with the application process 10 to pass validated inputs directly to the application process 10 without any further interaction with the server 50. In handling system inputs 66 which do not meet the validation criteria, the validation engine 16 may selectively modify invalid inputs to comply with the validation criteria and forward the modified inputs to the application process 10, or return a message to the server 50 indicating that the system input does not meet the validation criteria. Again, this is merely a sample embodiment of a validation engine and embodiments of the present invention are not limited in this respect.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A communication system comprising:
    a communication network;
    a client process hosted on a client device to receive user inputs from a user interface and to transmit the inputs through the communication network;
    a plurality of communication interfaces to receive inputs to an application process from a plurality of sources, a first communication interface being adapted for receiving inputs from the client process according to a first Internet compliant protocol and a second communication interface being adapted for receiving inputs according to a second Internet compliant protocol distinct from the first Internet compliant protocol; and
    a validation engine to define Internet protocol specific validation criteria for inputs to the application provided according to at least the first and second Internet compliant protocols, and to provide validation data representative of the validation criteria for inputs to the application provided according to the first Internet compliant protocol in response to a query from the first communication interface.

2. The communication system of claim 1, wherein the first communication interface comprises an HTTP server and the client process comprises a network browser, and wherein the first communication interface comprises logic to transmit computer readable instructions to the client process for validating inputs provided at the network browser according to the first Internet compliant protocol.

3. The communication system of claim 1, wherein the second communication interface comprises one of an SNMP manager, an electronic mail process, and a VoIP process.

4. The communication system of claim 1, wherein the first communication interface comprises logic to transmit machine-readable instructions to the client process for generating a graphical user interface to accept user inputs and for validating inputs received at the graphical user interface.

5. The communication system of claim 1, wherein the second communication interface is adapted to receive inputs to the application process from an external process independently of any input validation at the external process, and wherein the validation engine provides a message to the second communication interface to indicate whether the received inputs are valid.

6. The communication system of claim 5, wherein the second communication interface comprises logic to receive inputs to the application process from the external process according to one of a simple network management protocol (SNMP), an electronic mail protocol and a voice over Internet protocol.

7. The communication system of claim 1, wherein at least one of the communication interfaces is adapted to receive inputs to the application process from an external process independently of any input validation at the external process, and wherein the validation engine comprises logic to provide validated inputs to the application process based upon the received inputs.

8. The communication system of claim 1, wherein a third one of said plurality of communication interfaces comprises a telephony server to receive inputs to the application process from a public switched telephone network.

9. A server comprising:
a plurality of communication interfaces to receive inputs to an application process, a first communication interface being adapted for receiving inputs from a client process hosted on a client device according to a first Internet compliant protocol and a second communication interface being adapted for receiving inputs according to a second Internet compliant protocol distinct from the first Internet compliant protocol; and
a validation engine to define Internet protocol specific validation criteria for inputs to the application provided according to at least the first and second Internet compliant protocols, and to provide validation data representative of the validation criteria in response to a query from the first communication interface.

10. The server of claim 9, wherein the first communication interface comprises an HTTP server and the client process comprises a network browser, and wherein the first communication interface comprises logic to transmit computer readable instructions to the client process for validating inputs provided at the network browser based upon the validation data.

11. The server of claim 9, wherein the second communication interface comprises one of an SNMP manager, an electronic mail process, and a VoIP process.

12. The server of claim 9, wherein the first communication interface comprises logic to transmit machine-readable instructions to the client process for generating a graphical user interface to accept user inputs and for validating inputs received at the graphical user interface.

13. The server of claim 9, wherein the second communication interface is adapted to receive inputs to the application process from an external process independently of any input validation at the external process, and wherein the validation engine comprises logic to provide a message to the second communication interface to indicate whether the received inputs are valid.

14. The server of claim 13, wherein the second communication interface receives inputs to the application process from the external process according to one of a simple network management protocol (SNMP), an electronic mail protocol and a voice over Internet protocol.

15. The server of claim 9, wherein at least one of the communication interfaces is adapted to receive inputs to the application process from an external process independently of any input validation at the external process, and wherein the validation engine comprises logic to provide validated inputs to the application process based upon the received inputs.

16. The server of claim 9, wherein a third one of said plurality of communication interfaces comprises a telephony server to receive input to the application process from a public switched telephone network.

17. An article of manufacture comprising:
a storage medium comprising machine-readable instructions stored thereon for:
determining validation criteria for inputs to an application process from each of a plurality of communication interfaces of a server, a first communication interface being adapted for receiving inputs to the application process from a first client process hosted on a first client device according to a first Internet compliant protocol and a second communication interface being adapted for receiving inputs to the application process according to a second Internet compliant protocol distinct from the first Internet compliant protocol;
providing validation data representative of the validation criteria for inputs received according the first Internet compliant protocol in response to a first query from the communication server;
determining the validity of inputs received at the first interface based upon the first validation data.

18. The article of manufacture of claim 17, wherein the second communication interface comprises an HTTP server to communicate with a network browser hosted on a second client device, and wherein the storage medium further comprises machine-readable instructions stored thereon for generating machine-readable instructions executable on the second client device for validating inputs provided at a user interface associated with the network browser based upon the validation criteria for inputs provided to the application process according to the second Internet compliant protocol.

19. The article of manufacture of claim 17, wherein the first communication interface is adapted to receive inputs to the application process from an external process, and wherein the storage medium further comprises machine-readable instructions stored thereon for providing a message to the second communication interface to indicate whether inputs received from the external process are valid.

20. The article of manufacture of claim 19, wherein the storage medium further comprises machine-readable instructions stored thereon for determining validity of inputs to the application process received at the first communication interface from the external process according to one of a simple network management protocol (SNMP), an electronic mail protocol and a voice over Internet protocol.

21. The article of manufacture of claim 17, wherein the storage medium further comprises machine-readable instructions stored thereon for:

validating inputs to the application process received at the first communication interface from an external process; and providing validated inputs to the application process based upon the inputs received at the first communication interface.

22. The article of manufacture of claim 17, wherein the storage medium further comprises machine-readable instructions stored thereon for determining validation criteria for inputs to the application process from a third one of said plurality of communication interfaces comprising a telephony server to receive inputs to the application process from a public switched telephone network.

23. A method comprising:

receiving inputs to an application process at each of a plurality of communication interfaces of a server, a first communication interface being adapted for receiving inputs to the application process from a client process hosted on a client device according to a first Internet compliant protocol and a second communication interface being adapted for receiving inputs to the application process according to a second Internet compliant protocol distinct from the first Internet compliant protocol;

determining Internet protocol specific validation criteria for inputs to the application process provided according to at least the first and second Internet compliant protocol;

transmitting computer readable instructions to the client process for validating inputs provided at a user interface associated with the client device based upon the validation criteria for inputs provided according to the first Internet compliant protocol; and determining the validity of inputs received according to the second Internet compliant protocol.

24. The method of claim 23, wherein the first communication interface comprises an HTTP server and the client process comprises a network browser, and wherein the method further comprises generating machine-readable instructions executable on the client device for validating inputs provided at a user interface associated with the network browser based upon the validation criteria for inputs provided according to the first Internet compliant protocol.

25. The method of claim 23, wherein the second communication interface is adapted to receive inputs to the application process from an external process, and wherein the method further comprises providing a message to the second communication interface to indicate whether the received inputs are valid.

26. The method of claim 23, the method further comprising determining validity of inputs to the application process transmitted to the second communication interface from the external process according to one of a simple network management protocol (SNMP), an electronic mail protocol and a voice over Internet protocol.

27. The method of claim 23, the method further comprising:

validating inputs to the application process received at the second communication interface from an external process; and providing validated inputs to the application process based upon the inputs received at the second communication interface.

28. The method of claim 23, wherein a third one of said plurality of communication interfaces comprises a telephony server to receive inputs to the application process from a public switched telephone network.

29. An apparatus comprising:

means for receiving inputs to an application process at each of a plurality of communication interfaces of a server, a first communication interface being adapted for receiving inputs to the application process from a client process hosted on a client device according to a first Internet compliant protocol and a second communication interface being adapted for receiving inputs to the application process according to a second Internet compliant protocol distinct from the first Internet compliant protocol;

means for determining Internet compliant protocol specific validation criteria for inputs to the application process provided according to at least the first and second Internet compliant protocols;

means for transmitting computer readable instructions to the client process for validating inputs provided at a user interface associated with the client device based upon the validation criteria for inputs provided to the application process according to the first Internet compliant protocol; and means for determining the validity of inputs received according to the second Internet compliant protocol.

30. The apparatus of claim 29, wherein the first communication interface comprises an HTTP server and the client process comprises a network browser, and wherein the apparatus further comprises means for generating machine-readable instructions executable on the client device for validating inputs provided at a user interface associated with the network browser based upon the validation criteria for inputs provided according to the first Internet compliant protocol.

31. The apparatus of claim 29, wherein the second communication interface is adapted to receive inputs to the application process from an external process, and wherein the apparatus further comprises means for providing a message to the second communication interface to indicate whether the received inputs are valid.

32. The apparatus of claim 29, the apparatus further comprising means for determining validity of inputs to the application process transmitted to the second communication interface from the external process according to one of a simple network management protocol (SNMP), an electronic mail protocol and a voice over Internet protocol.

33. The apparatus of claim 29, the apparatus further comprising:

means for validating inputs to the application process received at the second communication interface from an external process; and means for providing validated inputs to the application process based upon the inputs received at the second communication interface.

34. The apparatus of claim 29, wherein a third one of said plurality of communication interfaces comprises a telephony server to receive inputs to the application process from a public switched telephone network.

* * * * *